UNITED STATES PATENT OFFICE.

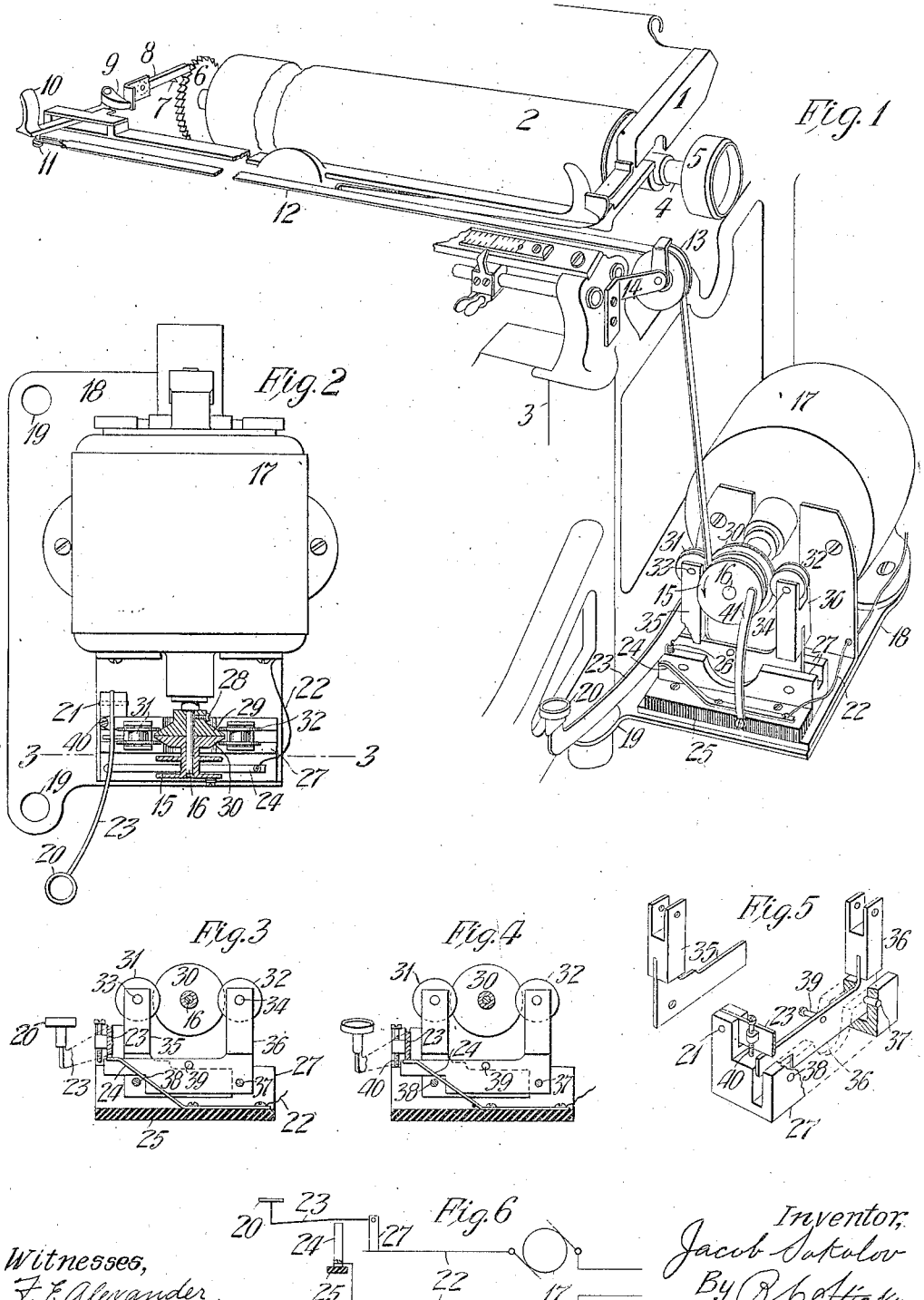

JACOB SOKOLOV, OF NEW YORK, N. Y., ASSIGNOR TO UNDERWOOD TYPEWRITER COMPANY, OF NEW YORK, N. Y., A CORPORATION OF DELAWARE.

TYPE-WRITING MACHINE.

1,062,194. Specification of Letters Patent. Patented May 20, 1913.

Application filed January 12, 1911. Serial No. 602,163.

*To all whom it may concern:*

Be it known that I, JACOB SOKOLOV, a subject of the Czar of Russia, residing in the borough of Brooklyn, New York city, in the county of Kings and State of New York, have invented certain new and useful Improvements in Type-Writing Machines, of which the following is a specification.

The present invention relates to that class of typewriting machines in which the carriage return and line spacing operations are effected by power actuated means suitably controlled from the keyboard or elsewhere. It is not new with the present invention to effect these operations from a continuous source of power, nor is it new with this invention, in effecting the carriage return, to connect the carriage positively to a source of power, continuous or otherwise; nor is it new to provide a non-positive connection from a continuous source of power to the carriage by means of a friction or other slip gear in the driving connections. A slip or yielding connection has been recognized as desirable for the purpose of protecting the mechanism from injury in event of blocking of the machine or in event of excessive load on the connections, and also for protecting the machine from the effects of sudden application of the power. A continuous source of power is desirable in connection with certain machines and under certain conditions, but involves some waste of power, and is unnecessary under other conditions.

In the preferred form of the invention hereinafter disclosed, the carriage return mechanism is shown as operated from a source of power which is inactive except upon depression of the key to return the carriage. The connections from the source of power to the carriage are not entirely positive, but on the contrary are such as to permit of slip in event of overload.

One feature of this invention is to provide, between the carriage and the source of power, a yielding connection, as reliable as a positive connection in its driving operation, although involving but few and simple parts and movements; and equally reliable in its yielding action in event of overload on the connections.

It is a feature to provide means for adjusting the strength of the yielding connection to permit of yield at any desired and predetermined load.

It is a feature of this invention to provide a novel and simple key control for a normally inactive source of power; and it is a further feature to employ the same key controlled device both for rendering active the source of power and for establishing a yieldable connection between the same and the carriage.

It will be understood that the several features of the invention may or may not be combined in one machine.

In the embodiment of the invention hereinafter shown, the slip or yielding connection comprises two friction gear members, one positively connected to the source of power and the other positively connected to the carriage; these gear members consist of rotary elements the opposing friction surfaces of which are substantially flat, and the other faces of which have an annular bevel, the friction surfaces are not normally in driving contact, but there is provided a key controlled means movable at right angles to the axis of rotation of the friction members and adapted to coöperate with the beveled faces to exert a wedge-like action on the friction members to force the same into driving contact; the source of power is normally inactive but is controlled by an electric circuit, comprising in part the key lever which controls the engagement of the friction gears, so that when this key lever is actuated to set the friction gears for a carriage drive, it also acts as a switch to close the circuit of a motor for driving the gears to return the carriage.

Other objects and advantages will hereinafter appear.

In the accompanying drawings, Figure 1 is a perspective view of a typewriter, with motor attached, and showing the carriage return connections from the motor to the line-spacing lever of the typewriter, parts not illustrating the invention being broken away. Fig. 2 is a top plan of the motor, partly cross sectional, to show more clearly the driving connection from the motor shaft to the carriage draw band. Fig. 3 is a view in end elevation on the line 3—3 of Fig. 2, the carriage return key being in normal position. Fig. 4 is a view similar to Fig. 3, except that the key is in depressed position to close the circuit of the motor. Fig. 5 is a perspective view, showing the key lever and the levers actuated thereby to control the drive from the motor. Fig. 6 is a diagrammatic view of the motor circuit and carriage return key for controlling the same.

The carriage 1 carrying the platen cylinder 2 is indicated as mounted in the usual manner to have longitudinal movement in the frame 3 of the machine. The platen shaft 4 carries the usual hand wheel 5 and line spacing wheel 6. The line spacing wheel 6 is actuated as in the "Underwood" typewriter by means of a pawl 7 carried by a slide 8 which latter is mounted in the carriage frame and is actuated by one arm 9 of the line spacing and carriage return lever 10. Attached at 11 to the carriage return and line spacing lever 10 is a draw band 12 which passes over an idler 13 supported in a bracket 14 at the right hand side of the machine, and then passes down and is attached to a drum 15, which, when rotated in the direction indicated by the arrow in Fig. 1, causes the draw band to be wound upon the same, and in so doing, causes the line spacing lever first to line space and then to return the carriage by movement to the right with the draw band.

The carriage draw band drum 15 is loosely mounted on the shaft 16 which forms an extension to the armature shaft of a motor 17 supported on a base 18 attached as at 19 to the frame 3 of the typewriting machine. Although normally disconnected from the shaft 16 of the motor, the drum 15 is nevertheless adapted to be connected to the motor shaft to line space the platen and return the carriage whenever a key 20 for this purpose is depressed. The key 20 is carried by a key lever 23 pivoted at 21 to a block 27 attached to the base plate 18 of the motor. The block 27 is electrically connected to the key lever 23, and both are in the circuit 22 of the motor (see Fig. 6). One terminal 24 of this circuit consists of a metallic strip attached to a block 25 of insulating material on the base plate 18. A coil compression spring 26 supported on the block 27 bears at its upper end against the key lever 23 and holds the key lever and key in normal position, returning the same to normal position after each operation of the same. The terminal strip 24 projects under the key lever 23 in such manner that when the key lever is depressed, it is brought into contact with the terminal 24 and by connecting the latter with the block 27, establishes the motor circuit and starts the motor.

The drum 15 is loose on the motor shaft, and, in order that the motor, when started, may cause the drum to be rotated, the following connections from the drum to the motor shaft are provided. Fast to the motor shaft by means of a set screw 28 is a friction gear 29 having a flat outer face and a beveled inner face. Fast to the drum 15, and with it normally loose on the shaft 16, is a second friction gear 30 having a flat face opposed to the flat face of the gear 29, and being also tapered or beveled on its other face. The drum 15 with the gear 30 has a slight longitudinal play on the shaft 16. This play is controlled by a spring 41 which bears against the outer face of the drum 15 and tends to urge the gear 30 against the gear 29. The spring 41 is not, however, strong enough to maintain an effective driving contact between the gears 29 and 30. Other means, operated by the key 20, are provided for forcing and holding the gear 30 against the gear 29 with the requisite pressure for driving the drum. When such contact is established, the gear 30 revolves with the gear 29, and the drum 15 consequently revolves with the motor shaft.

The key operated means for forcing the gear 30 against the gear 29 comprises two rotary members 31 and 32, one at either side of the shaft 16, and each having two disks spaced sufficiently apart so that the one disk may engage the beveled face of the gear 29, and the other disk the beveled face of the gear 30. When the members 31 and 32 are forced toward the motor shaft, they press against the bevels of the gears 29 and 30 and exert a wedge or cam-like action on the latter to force and hold the gears together. The members 31 and 32 are idlers, the bearing pins 33 and 34 of which are carried in the upright arms of two bell crank levers 35 and 36. The lever 35 is pivoted at 38 to the block 27, and the lever 36 is pivoted to the block at 37. When the levers are rocked to move the upright arms toward each other, the members 31 and 32 act on the beveled faces of the gears 29 and 30, and also rotate freely with these gears. When the levers are rocked to move the arms apart, the pressure of the gear 30 on the gear 29 is relieved.

The key lever 23 when depressed to make the circuit of the motor, also engages and depresses the lower or horizontal arm of the lever 36 and moves the rotary member 32 toward the gears 29 and 30. The horizontal arm of the lever 36 carries a pin 39 which, when the lever 36 is rocked by the key lever, engages the upper face of the lower or horizontal arm of the lever 35, thereby causing the latter also to be rocked on its pivot to move the member 31 toward the gears 29 and 30. There is therefore upon depression of the key lever a scissor-like movement of the levers 35 and 36 to and from the gears 29 and 30, to cause the latter to be pressed together.

An advantage of the present construction is the nice control the operator has over the return of the carriage. By a light pressure on the key 20 the frictional contact between the gears 29 and 30 will be insufficient to entirely prevent slipping during the return of the carriage, so that the latter moves comparatively slowly. The return movement may, therefore, be made as slowly as desired simply by regulating the pressure on the finger key. It will also be apparent that full pressure may be applied to the finger key during a portion of the return movement and the pressure reduced before the carriage completes its return movement, so that it will be brought to a gradual and easy stop.

An adjustable stop pin 40 on the key lever, by engagement with the face of the block 27, determines the downward movement of the key lever, and consequently determines the movement of the levers 35 and 36. In determining the movement of the levers 35 and 36, the stop 40 determines the contact pressure of one friction member against the other; and, as the stop is adjustable, it serves as a means for adjusting this pressure, so that the gears may slip when a predetermined load is applied to the driving connections. The frictional engagement of gear 29 with gear 30 is adjusted to an amount sufficient to effect the return of the carriage by the motor under normal conditions, while permitting slip in event of blocking of the machine or of an excessive load such as might result in injury to the mechanism by means of the application of the motive force.

When the key lever is released, the members 31 and 32 are thrown by the gears 29 and 30 to normal position. The spring 41 is a brake which by bearing against the face of the drum 15 controls the movement of the latter during the feed of the carriage to prevent over-run of the drum.

A simple and effective embodiment of the invention has been disclosed, but it will be understood that the same may be variously modified within the scope of the invention.

Having thus described my invention, I claim:

1. In a typewriting machine, the combination of a carriage, a carriage-return mechanism comprising a drive shaft, means for driving said shaft, a friction member fast to said shaft, a second friction member normally disconnected from said shaft, a drum connected to said second friction member, a draw-band connected to said drum and to the carriage, key-controlled means for relatively moving said friction members into operative engagement with one another, and means for adjusting the throw of said key to vary the load at which said friction members will slip.

2. In a typewriting machine, the combination of a carriage, a carriage-return mechanism comprising a drive shaft, means for driving said shaft, a friction member fast to said shaft, a second friction member loose on said shaft, a drum connected to said second friction member, a draw-band connected to said drum and to the carriage, key-controlled means for relatively moving said friction members into operative engagement with one another, and means for adjusting the throw of said key to vary the load at which said friction members will slip.

3. In a typewriting machine, the combination of a carriage, a carriage-return mechanism comprising a drive shaft, normally inactive means for driving said shaft, a friction member fast to said shaft, a second friction member normally loose on said shaft, a drum connected to said second friction member, a draw-band connected to said drum and to the carriage, key-controlled means for relatively moving said friction members into operative engagement with one another, and for rendering active said shaft driving means, and means for adjusting the throw of said key to determine the load at which said friction members will slip.

4. In a typewriting machine, the combination of a carriage, a power-shaft, connections from the power shaft to the carriage for returning the latter, said connections comprising two friction members, one of which members carries a cam or wedge whereby the two members may be moved relatively with driving contact, key-controlled means for coöperating with said cam or wedge to establish driving contact of said friction members, and means for adjusting the throw of said key to determine the load at which said friction members will slip.

5. In a typewriting machine, the combination of a carriage, a power-shaft, connections from the power shaft to the carriage for returning the latter, said connections comprising two friction members movable relatively into and out of driving contact with each other, said members having oppositely inclined faces, and key-controlled means for engaging said inclined faces with a wedge or cam-like action to force the friction members together.

6. In a typewriting machine, the combination of a carriage, a power shaft, connections from the power shaft to the carriage for returning the latter, said connections comprising two rotary friction members movable relatively into and out of driving contact with each other, said members having oppositely inclined annular faces, and key-controlled means for engaging said inclined faces with a wedge or cam like action to force the friction members together.

7. In a typewriting machine, the combination of a carriage, a power shaft, connections from the power shaft to the carriage for returning the latter, said connections comprising two rotary friction members movable relatively into and out of driving contact with each other, said members having oppositely inclined annular faces, and key-controlled disks for engaging said inclined faces with a wedge or cam like action to force the friction members together.

8. In a typewriting machine, the combination of a carriage, a power shaft, connections from the power shaft to the carriage for returning the latter, said connections comprising two rotary friction members movable relatively into and out of driving contact with each other, said members having oppositely inclined faces, a rotary member having two annular surfaces spaced so that one of said surfaces may engage the inclined face of one of the friction members and the other the inclined face of the other friction member, and key-controlled means for moving said last-named rotary member to cause the annular surfaces thereof to act on the inclined faces of the friction members with a cam or wedge-like action.

9. In a typewriting machine, the combination of a carriage, a power shaft, connections from the power shaft to the carriage for returning the latter, said connections comprising two rotary friction members movable relatively into and out of driving contact with each other, said members having oppositely inclined faces, means comprising two disks rotatably mounted and spaced apart so that one of said disks may engage the inclined face of one of the friction members and the other the inclined face of the other friction member, and key-controlled means for forcing said disks against the inclined faces of the friction members, whereby a cam or wedge-like action is exerted on the friction members to force the same into driving contact.

10. In a typewriting machine, the combination of a carriage, a power shaft, connections from the power shaft to the carriage for returning the latter, said connections comprising two rotary friction members one of which in addition to its friction surface has a beveled annular surface, a rotary disk, and means for forcing the disk against said beveled face of the friction member with a cam or wedge-like action whereby said friction member is forced into driving contact with said other friction member.

11. In a typewriting machine, the combination of a carriage, a power shaft, connections from the power shaft to the carriage for returning the latter, said connections comprising two rotary friction members one of which in addition to its friction surface has a beveled annular surface, a rotary disk, and a key operated lever for forcing the disk against said beveled face of the friction member with a cam or wedge-like action whereby said friction member is forced into driving contact with said other friction member.

12. In a typewriting machine, the combination of a carriage, a power shaft, connections from the power shaft to the carriage for returning the latter, said connections comprising two rotary friction members one of which in addition to its friction surface has a beveled annular surface, a rotary disk, and a key operated lever on which said disk is mounted for forcing the disk against said beveled face of the friction member with a cam or wedge-like action whereby said friction member is forced into driving contact with said other friction member.

13. In a typewriting machine, the combination of a carriage, a power shaft, connections from the power shaft to the carriage for returning the latter, said connections comprising two rotary friction members one of which in addition to its friction surface has a beveled annular surface, two rotary disks one on each side of the bearing of said beveled friction member, and means for forcing said disks in opposite directions against said beveled surface to exert thereon a cam or wedge-like action whereby said beveled friction member is forced into driving contact with said other friction member.

14. In a typewriting machine, the combination of a carriage, a power shaft, connections from the power shaft to the carriage for returning the latter, said connections comprising two rotary friction members one of which in addition to its friction surface has a beveled annular surface, two rotary disks one on each side of the bearing of said beveled friction member, and two levers, one supporting each of said disks, for forcing said disks in opposite directions against said beveled surface to exert thereon a cam or wedge-like action whereby said beveled friction member is forced into driving contact with said other friction member.

15. In a typewriting machine, the combination of a carriage, a power shaft, connections from the power shaft to the carriage for returning the latter, said connections comprising two rotary friction members one of which in addition to its friction surface has a beveled annular surface, two rotary disks one on each side of the bearing of said beveled member, two levers, one supporting each of said disks, for forcing said disks in opposite directions against said beveled surface to exert thereon a cam or wedge-like action whereby said beveled friction member is forced into driving contact with said other friction member, key-controlled means for actuating one of said levers, and means for operating the other lever from the key-actuated lever.

16. In a typewriting machine, the combination of a carriage, a power shaft, connections from the power shaft to the carriage for returning the latter, said connections comprising two rotary friction members one of which in addition to its friction surface has a beveled annular surface, two rotary disks one on each side of the bearing of said beveled member, two levers, one supporting each of said disks, for forcing said disks in opposite directions against said beveled surface to exert thereon a cam or wedge-like action whereby said beveled friction member is forced into driving contact with said other friction member, key-controlled means for actuating one of said levers, and a wrist-pin carried by the lever so actuated, for engaging and simultaneously actuating the other lever.

17. In a typewriting machine, the combination of a carriage, a power shaft, connections from the power shaft to the carriage for returning the latter, said connections comprising two rotary friction members one of which in addition to its friction surface has a beveled annular surface, two rotary disks one on each side of the bearing of said beveled friction member, two bell crank levers pivoted one on each side of the bearing of said beveled friction member, one arm of each lever supporting one of said rotary disks, and the other arms of said levers overlapping a projection on one of the overlapping arms for engaging the other of the overlapping arms to cause the levers to operate simultaneously, and means for actuating the lever which carries said projection so that the disks carried by said levers may be forced against said beveled face of the friction member to exert on said member a cam or wedge like action for pressing said friction member into driving contact with said other friction member.

18. In a typewriting machine, the combination of a carriage, a power shaft, connections from the power shaft to the carriage for returning the latter, said connections comprising two rotary friction members each of which in addition to its friction surface has a beveled annular surface, two pairs of disks, one pair on each side of the bearing of said friction members, and means for forcing said pairs of disks in opposite directions toward said friction members to cause the beveled surfaces of the latter to be engaged between the disks of each pair with a cam or wedge-like action whereby the friction members are pressed into driving contact with each other.

19. In a typewriting machine, the combination of a carriage, a power shaft, connections from the power shaft to the carriage for returning the latter, said connections comprising two rotary friction members, one of which members in addition to its friction surface has a beveled annular surface, two elements one to each side of the bearing of said beveled friction member, two two-armed levers on one arm of each of which one of said last named elements is supported, key-controlled means for actuating one of said levers to force the element supported thereby against said beveled surface with a cam or wedge-like action, and means carried by the lever so actuated for engaging and actuating the other lever to cause the element supported thereby to act in similar manner on said beveled annular surface, whereby said beveled friction member is forced into driving contact with said other friction member.

20. In a typewriting machine, the combination of a carriage, a normally inactive power shaft, connections from the power shaft to the carriage for returning the latter, said connections comprising two rotary friction members, one of which members in addition to its friction surface has a beveled annular surface, two elements one to each side of the bearing of said beveled friction member, two two-armed levers on one arm of each of which one of said last named elements is supported, key-controlled means for actuating one of said levers to force the element supported thereby against said beveled surface with a cam or wedge-like action, means carried by the lever so actuated for engaging and actuating the other lever to cause the element supported thereby to act in similar manner on said beveled annular surface, whereby said beveled friction member is forced into driving contact with said other friction member, and means whereby said key-controlled means, when operated, starts the power shaft.

21. In a typewriting machine, the combination of a carriage, a power shaft, connections from the power shaft to the carriage for returning the latter, said connections comprising two rotary friction members each of which in addition to its friction surface has a beveled annular surface, two pairs of disks, one pair on each side of the bearing of said friction members, means for forcing said pairs of disks in opposite directions toward said friction members to cause the beveled surfaces of the latter to be engaged between the disks of each pair with a cam or wedge-like action whereby the friction members are pressed into driving contact with each other, and key-controlled levers for supporting and shifting said disks as aforesaid.

22. In a typewriting machine, the combination of a carriage, a normally inactive power shaft, carriage-return connections from the power shaft to the carriage, said connections comprising a slip connection, key-controlled means for rendering said power shaft active, and means for varying the throw of the key to determine the load at which said connection will slip.

23. In a typewriting machine, the combination of a carriage, a normally inactive power shaft, carriage-return connections from the power shaft to the carriage, a friction gear forming part of said connections, key-controlled means for rendering said power shaft active and for establishing the driving contact of said friction gear, and means for varying the throw of the key to determine the load at which the driving contact will slip.

24. In a typewriting machine, the combination of a carriage, an electrically actuated, normally inactive power shaft, an electric circuit controlling the operation of said shaft, carriage return connections from the power shaft to the carriage, a friction gear forming part of said connections, a key-controlled lever for establishing the driving contact of said friction gear, said lever also acting as a switch to make and break the circuit which controls the power shaft so that when the lever is operated, the power shaft is rendered active, and means for varying the throw of said lever for varying the frictional engagement of said gear.

25. In a typewriting machine, the combination of a carriage, a carriage return mechanism comprising a drive shaft, means for driving said shaft, a friction member fast to said shaft, a second friction member normally loose on said shaft, a drum connected to said second friction member, a draw-band connected to said drum and to the carriage, key-controlled means for moving said friction members into operative engagement with one another, and means for adjusting the pressure of contact of said friction members, by altering the throw of said key.

26. In a typewriting machine, the combination of a carriage, a power shaft, connections from the power shaft to the carriage for returning the latter, said connections comprising two rotary friction members, one of which members in addition to its friction surface has a beveled annular surface, two elements one to each side of the bearing of said beveled friction member, two two-armed levers on one arm of each of which one of said last named elements is supported, key-controlled means for actuating one of said levers to force the element supported thereby against said beveled surface with a cam or wedge-like action, and means carried by the lever so actuated for engaging and actuating the other lever to cause the element supported thereby to act in similar manner on said beveled annular surface, whereby said beveled friction member is forced into driving contact with said other friction member; said key-controlled means having adjustable means for regulating the effective pressure of said friction members against each other.

27. In a typewriting machine, the combination with a carriage, of a carriage return mechanism comprising an electric motor, a friction member fast on the shaft of said motor, a second friction member loose on said shaft, a winding drum fast to said second friction member and carrying one end of a band fast on said carriage, rollers, and means to press said rollers against the said friction members and cause said friction members to bind and drive said drum to move said carriage, the reaction between said rollers and the friction members constantly tending to release said binding of the friction members.

28. In a typewriting machine, the combination with a carriage, of a carriage return mechanism comprising an electric motor, a friction member fast on the shaft of said motor, a second friction member loose on said shaft, said friction members having opposing flat faces, a winding drum fast to said second friction member and carrying one end of a band fast on said carriage, a flanged disk and means for causing the flanges of said disk to bear against said friction members and cause said friction members to bind and drive said drum to move said carriage, the reaction between said flanges and the friction members constantly tending to release said binding of the friction members.

29. In a typewriting machine, the combination with a carriage, of a carriage return mechanism comprising a drive shaft, means for driving said shaft, a friction member fast to said shaft, a second friction member normally disconnected from said shaft, a drum connected to said second friction member, a draw-band connected to said drum and to the carriage, a finger-key, and disk flanges operated thereby into engagement with the friction members for causing a relative movement of said friction members into operative engagement with one another with a pressure variable with the pressure on the key, thereby controlling the speed of the carriage.

30. In a typewriting machine, the combination of a carriage, a carriage return mechanism comprising a drive shaft, normally inactive means for driving said shaft, a friction member fast to said shaft, a second friction member normally loose on said shaft, a drum connected to said second friction member, a draw-band connected to said drum and to the carriage, and key-controlled disks engaging said friction members for relatively moving said friction members into operative engagement with one another and permitting a variable amount of slipping between the members controlled by the pressure on the key, thereby controlling the speed of the carriage.

31. In a typewriting machine, the combination of a carriage, a power shaft, connections from the power shaft to the carriage for returning the latter, said connections comprising two friction members movable relatively into and out of driving contact with each other, said members having oppositely inclined faces, a key, and means operated thereby to engage said inclined faces with a wedge or cam like action to force one friction member against the other with a pressure variable with the pressure on the key, and thereby vary the amount of slippage between said members.

32. In a typewriting machine, the combination of a carriage, a power shaft, connections from the power shaft to the carriage for returning the latter, said connections comprising two rotary friction members movable relatively into and out of driving contact with each other, said members having oppositely inclined annular faces, disks to engage said inclined faces with a wedge or cam like action to force one friction member into engagement with the other, a key, and means operated thereby to vary the pressure of the disks on the inclined faces in response to variations of the pressure on the key.

33. In a typewriting machine, the combination of a carriage, a power shaft, connections from the power shaft to the carriage for returning the latter, said connections comprising two rotary friction members movable relatively into and out of driving contact with each other, said members having oppositely inclined faces, a rotary member having two annular surfaces spaced so that one of said surfaces may engage the inclined face of one of the friction members, and the other the inclined face of the other friction member, and key-controlled means to move said last-named rotary member against the inclined faces of the friction members with a cam or wedge like action and vary the friction between the friction members in response to variations in the pressure on the key.

JACOB SOKOLOV.

Witnesses:
K. FRANKFORT,
B. GOLDBERG.